United States Patent [19]

Ellis-Brown

[11] Patent Number: 5,072,663
[45] Date of Patent: Dec. 17, 1991

[54] SHRIMP COOKING APPARATUS

[75] Inventor: Roy Ellis-Brown, New Smyrna Beach, Fla.

[73] Assignee: Seafood Equipment Development Corporation, Miami, Fla.

[21] Appl. No.: 692,290

[22] Filed: Apr. 26, 1991

[51] Int. Cl.[5] .............................................. A23L 3/00
[52] U.S. Cl. ................................. 99/331; 99/443 C; 99/468; 99/477; 99/483; 198/860.5
[58] Field of Search ................. 99/331, 330, 341, 403, 99/404, 410, 443 R, 443 C, 467, 468, 477, 483, 487; 126/20, 369; 426/510, 511, 523; 414/157; 198/861.1, 860.5, 860.3

[56] References Cited

U.S. PATENT DOCUMENTS

| | | | |
|---|---|---|---|
| 2,355,798 | 8/1944 | Guthier | 99/443 C |
| 3,491,679 | 1/1970 | Kelly | 99/477 |
| 3,583,171 | 6/1971 | Flynn | 198/860.5 |
| 3,856,135 | 12/1974 | Hayakawa et al. | 198/860.5 |
| 3,908,533 | 9/1975 | Fagerstrom et al. | 99/443 C |
| 4,417,507 | 11/1983 | Shotwell | 99/443 C |
| 4,532,857 | 8/1985 | Sollich | 99/483 |
| 4,644,857 | 2/1987 | Buller-Colthurst | 99/477 |
| 4,862,794 | 9/1989 | Lapeyre et al. | 99/516 |
| 4,887,524 | 12/1989 | Ellis-Brown | 99/404 |
| 4,966,072 | 10/1990 | Ellis-Brown | 99/477 |

FOREIGN PATENT DOCUMENTS 1266807  10/1986  U.S.S.R. ............ 198/860.5

Primary Examiner—Timothy F. Simone
Attorney, Agent, or Firm—William M. Hobby, III

[57] ABSTRACT

A shrimp cooking apparatus has a frame having a motor driven endless belt conveyor with a porous endless belt supported to the frame. The frame includes a plurality of upright members, each two upright members being connected by transverse support channels. A housing covers a portion of the porous endless belt and is supported on the frame and has an entrance thereinto and an exit therefrom. A steam pipe is connected to a source of steam and is connection to a plurality of steam nozzles for directing steam into the housing. The housing is formed from a pair of stainless steel layers having a predetermined layer of insulation therebetween. The housing has a lift mechanism attached thereto for lifting the housing relative to the plurality of frame members to thereby gain access inside the housing. A plurality of solenoid valves are operatively connected to temperature sensors to open and close each steam feedpipe nozzle to thereby control the feeding of steam into the housing. The housing lift mechanism includes individual chains mounted inside the upright frame member between pairs of sprockets and are driven by a motor driven rotating shaft located in a transverse beam and driving a sprocket on the chain drive at each end thereof in one of the upright channels. A lift bracket is attached to each chain which in turn is attached to the housing for lifting and lowering the housing responsive to the operation of the electric motor.

22 Claims, 4 Drawing Sheets

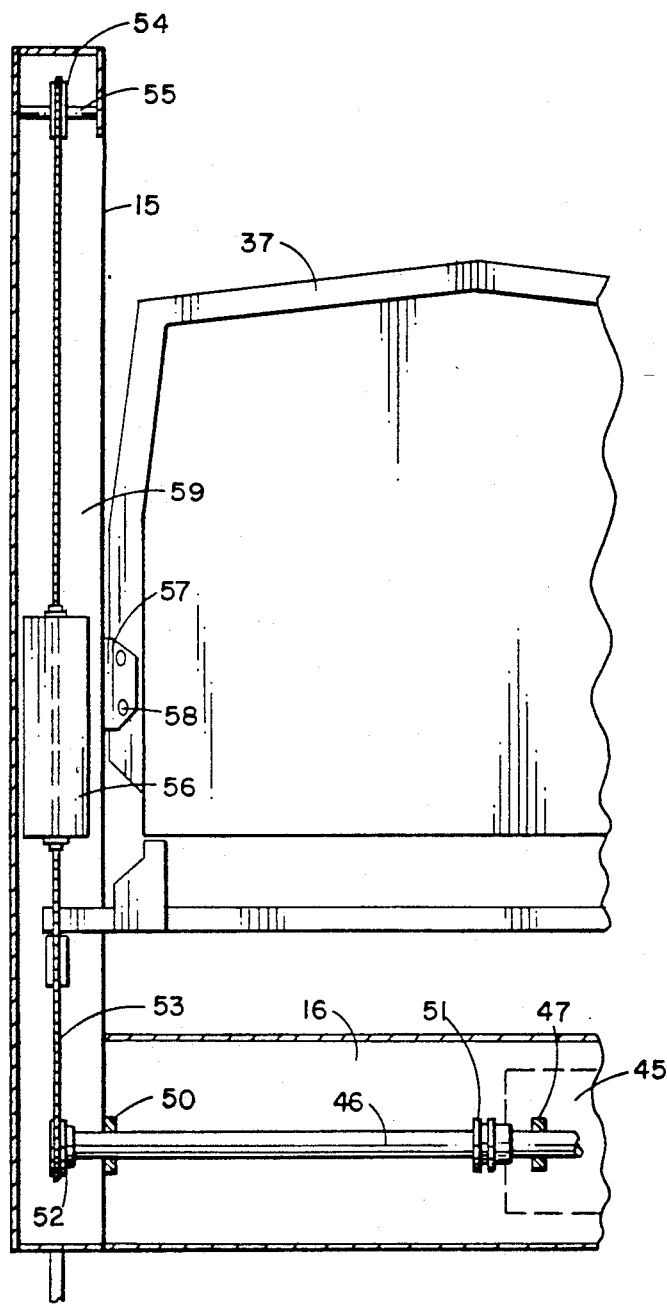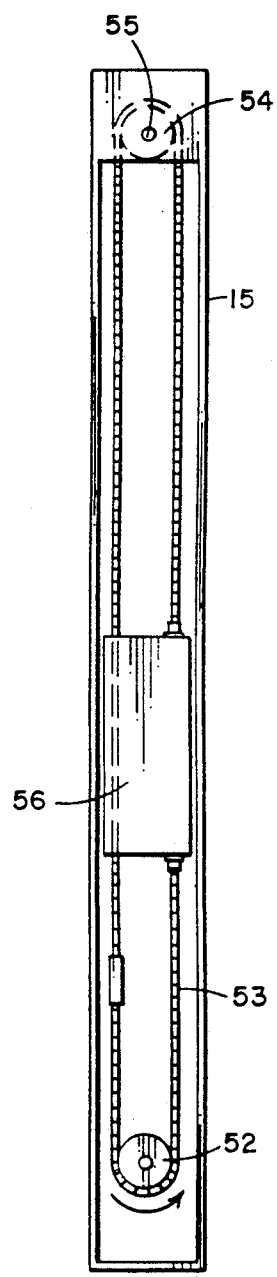
FIG. 4
FIG. 5

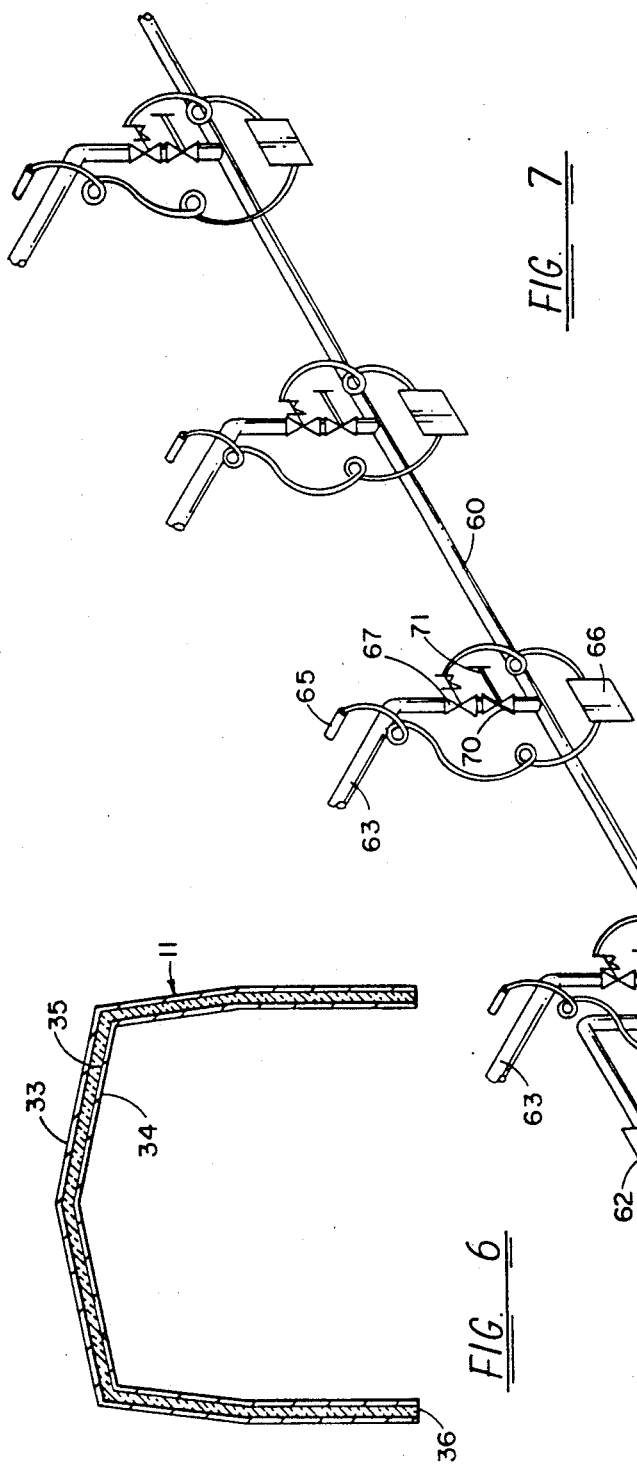
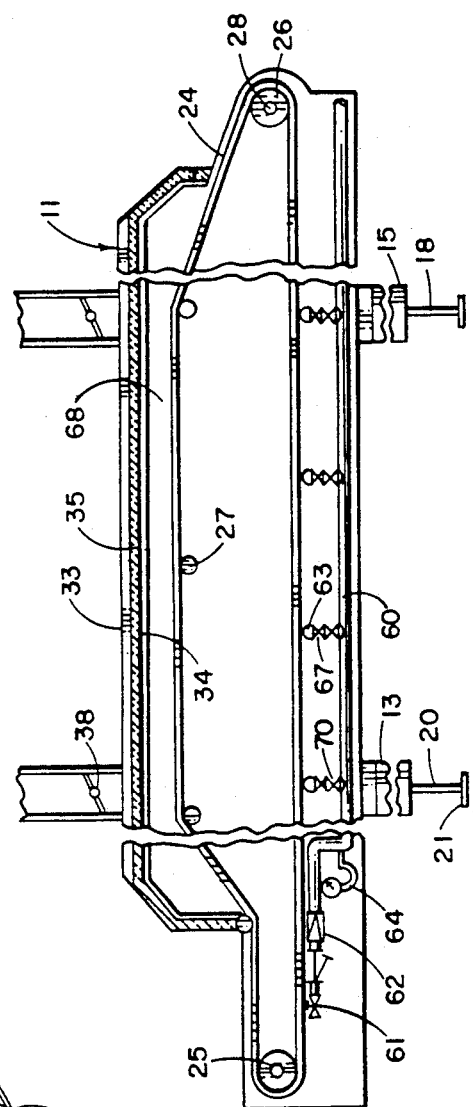
FIG. 7
FIG. 3
FIG. 6

SHRIMP COOKING APPARATUS

BACKGROUND OF THE INVENTION

The present invention relates to a cooking method and apparatus and in particular to such an apparatus specifically designed to cook shrimp.

In the past, a wide variety of cooking systems have been provided from simple pots to complex automated cooking ovens. Ovens having continuous conveyor belts have been provided in the past. These typically cook bakery products, and the like, and have electric or gas heating elements for baking cookies, bread, or the like, on conveyor belts passing through continuous ovens. This type of oven has a continuous flow of air at atmospheric pressure and is typically heated with electrical heat so that there is no build up of pressure as would be desirable in cooking seafood.

Shrimp are prepared utilizing a wide variety of prior art cooking methods and devices. In commercial cooking methods, however, it is generally customary to heat the shrimp with steam while applying pressure from an external source. See for example U.S. Pat. No. 3,501,317 to Veltman. In other methods such as the Hice U.S. Pat. No. 3,672,908, pressure from an external source is also applied prior to as well as during the heating of the shrimp.

An object of shrimp cooking processes is to avoid the weight loss during the heating step. As explained by Veltman, the cooking of shrimp in water, or an aqueous solutions, often causes a weight loss of between 30-50 percent resulting in a higher cost per pound of cooked shrimp.

Another object in any cooking process is to destroy or remove the bacteria present in the shrimp. Although acceptable for commercial purposes, many, if not most commercial shrimp cooking processes cannot remove bacteria below a 250,000 per gram plate count.

This invention is an improvement in my prior inventions set forth in U.S. Pat. No. 4,887,524 for a Shrimp Cooking Apparatus and my prior U.S. Pat. No. 4,966,072 for a Shrimp Cooking Apparatus. In those patents, a shrimp cooking apparatus used a frame having a motor driven endless belt conveyor with porous endless belts supported to the frame and a housing similar to the present invention. The steam is released directly beneath the belt and under the shrimp to heat the shrimp as they passed through the housing. In contrast, the present invention improves upon the prior systems by improving the housing which uses thin layers of stainless steel spaced by insulation to conserve energy in the system but which is reinforced with support brackets interconnected with a lifting mechanism formed in supporting upright channels and driven by central electric motors driving shafts to raise and lower the entire housing.

SUMMARY OF THE INVENTION

A shrimp cooking apparatus has a frame having a motor driven endless belt conveyor with a porous endless belt supported to the frame. The frame includes a plurality of upright members, each two upright members being connected by transverse support channels. A housing covers a portion of the porous endless belt and is supported on the frame and has an entrance thereinto and an exit therefrom. A steam pipe is connected to a source of steam and is connection to a plurality of steam nozzles for directing steam into the housing. The housing is formed from a pair of stainless steel layers having a predetermined layer of insulation therebetween. The housing has a lift mechanism attached thereto for lifting the housing relative to the plurality of frame members to thereby gain access inside the housing. A plurality of solenoid valves are operatively connected to temperature sensors to open and close each steam feedpipe nozzle to thereby control the feeding of steam into the housing. A control system is connected to each of the plurality of solenoid valves for controlling the operation of the valves. A plurality of sensors are used for sensing the temperature in the housing and each sensor is operatively connected to the control system to control the flow of steam into the housing responsive to the plurality of sensors sensing the condition within the housing so that shrimp can be cooked to a predetermined degree. The housing lift mechanism includes individual chains mounted inside the upright frame member between pairs of sprockets and are driven by a motor driven rotating shaft located in a transverse beam and driving a sprocket on the chain drive at each end thereof in one of the upright channels. A lift bracket is attached to each chain which in turn is attached to the housing for lifting and lowering the housing responsive to the operation of the electric motor.

BRIEF DESCRIPTION OF THE DRAWINGS

Other objects, features, and advantages of the present invention will be apparent from the written description and the drawings in which:

FIG. 3 is a sectional view taken lengthwise through the shrimp cooking apparatus of FIG. 1;

FIG. 4 is a partial sectional view taken through a portion of the lift mechanism and housing the embodiment of FIGS. 1-3;

FIG. 5 is an end sectional view of the upright beam of FIG. 4;

FIG. 6 is a sectional view taken through the housing of FIGS. 1-3; and

FIG. 7 is a diagrammatic view of the steam valving and feed for the shrimp cooker of FIGS. 1-6.

DESCRIPTION OF THE PREFERRED EMBODIMENT

Figure 1:
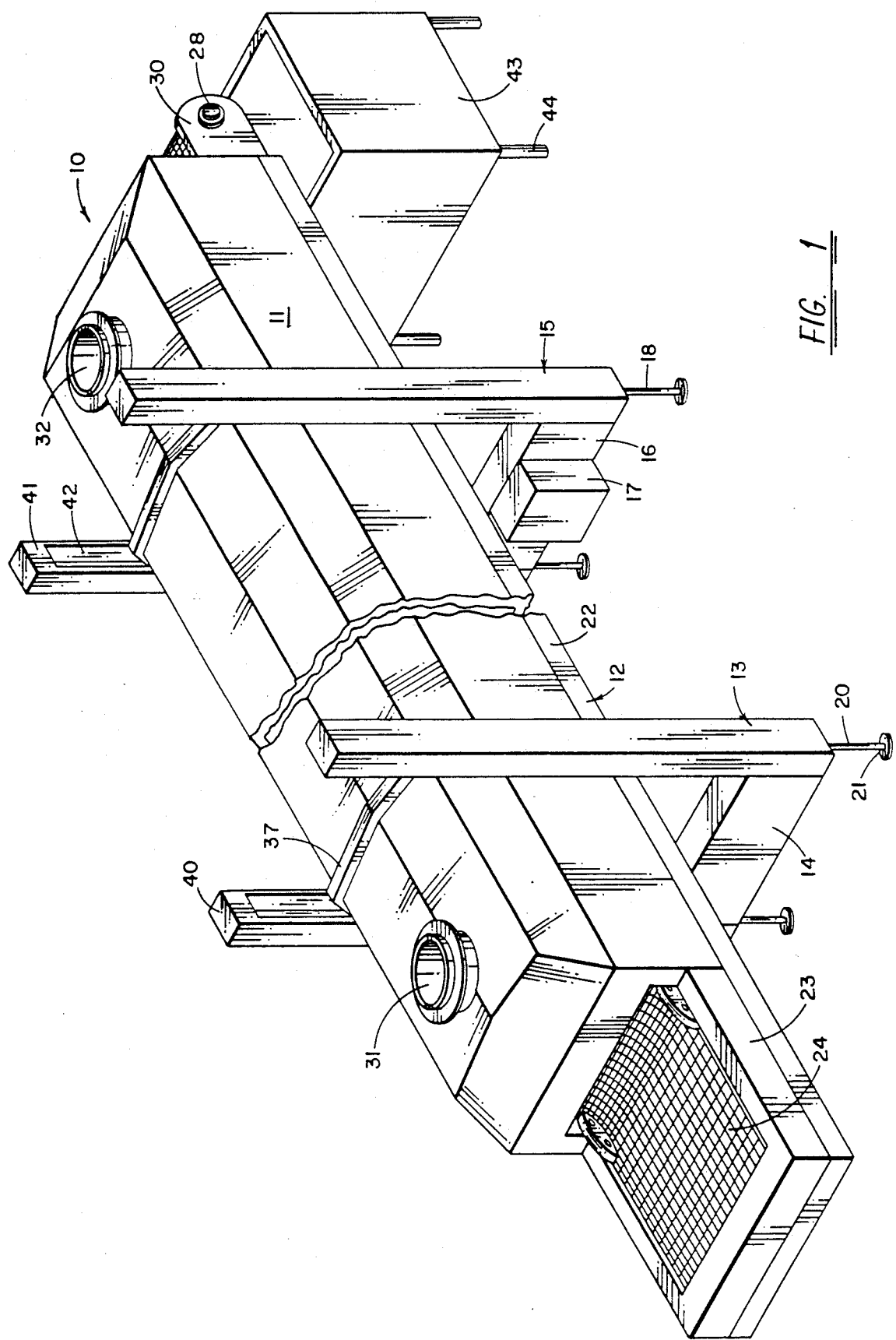
FIG. 1 is a perspective view of a shrimp cooking apparatus in accordance with the present invention.
Figure 2:
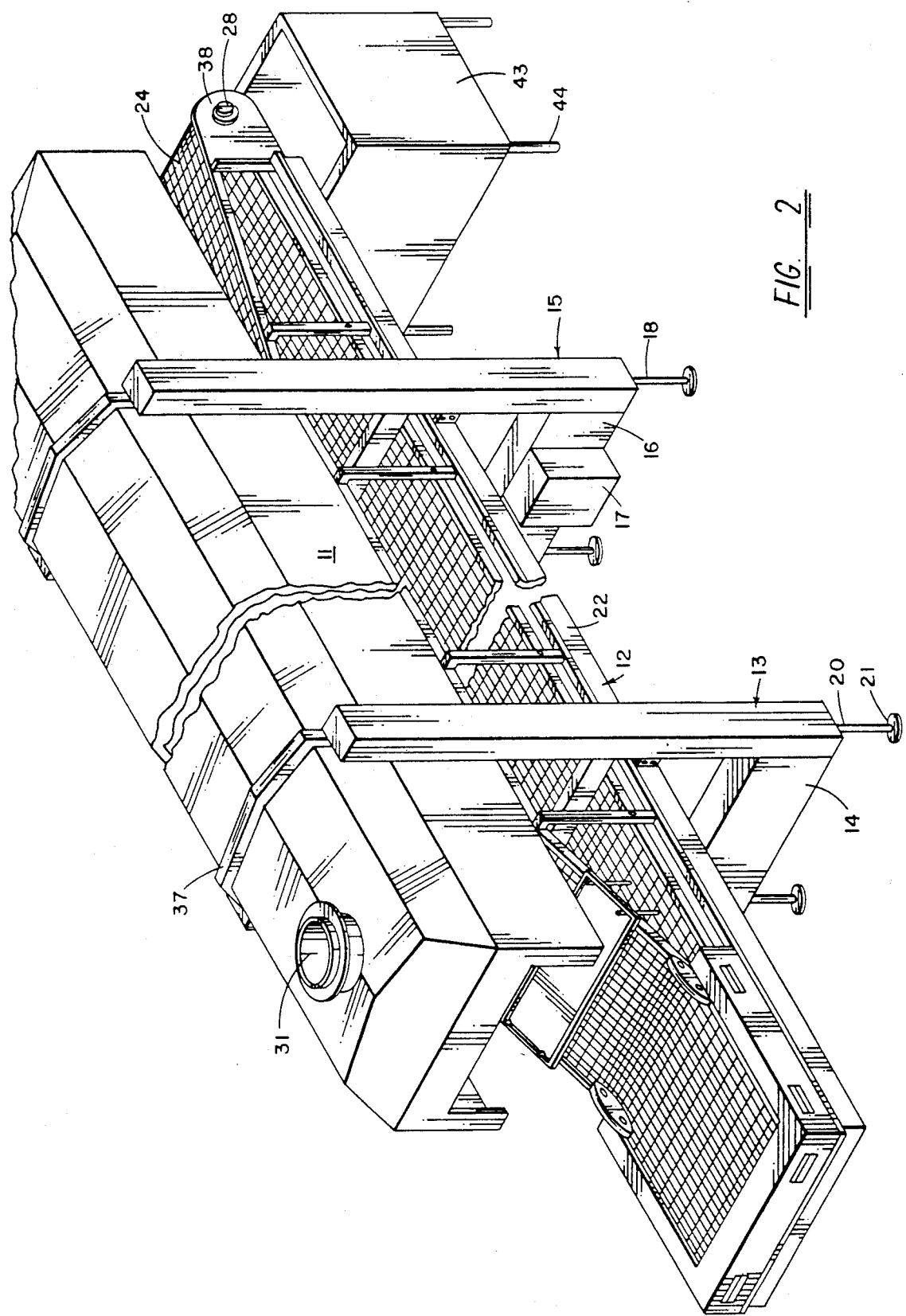
FIG. 2 is a perspective view of the embodiment of FIG. 1 with the housing raised on the lift mechanism.

Referring to the drawings and especially to FIGS. 1-3, a shrimp cooking apparatus 10 has a cover 11 and a frame 12. The frame includes a pair of upright channels 13 connected by a transverse channel beam 14 and a pair of upright channel posts 15 connected by a transverse channel beam 16. The beam 16 has a motor covering 7 attached to one side thereof. Each post 15 has an adjustable leg 18 adjustably attached thereto by a threaded portion. Each post 13 has an adjustable leg 20 and each has a pad 21 on the bottom thereof and is threadably adjustable for leveling the shrimp cooking apparatus 10. The frame 12 has an elongated base portion 22 and a conveyor support frame portion 23 having a stainless steel porous endless belt 24 mounted therein which belt extends around a pair of support rollers 25 and 26, as seen in FIG. 3, and also supported with a plurality of idler rollers 27. Support rollers 25 nd 26 have roller shafts 28 mounted in a frame portion 30 and are driven by electric motors for driving the endless conveyor belt 24. The housing 12 has a pair of stack outlets 31 and 32 which have electrically controlled dampers mounted therein for controlling the outlet of steam from the top of the housing 11 to control the temperature in the housing.

The housing 11, as seen in FIGS. 3 and 6, has a thin layer of stainless steel outer cover 33 and a stainless steel inner surface 34 spaced by a predetermined thickness of an insulating material 35, which can be, for instance, a rigid polymer foam, so that the layering effect gives the strength equivalent to a honeycomb material which is both light in weight and having a stainless steel cover with stainless steel caps 36 which provides insulation to the loss of heat from the cover during the injection of steam into the cooking apparatus. The cover 11 also has a pair of reinforcing and strengthening steel braces 37 which wrap around the outside of the cover which both strengthens the housing 11 and provides a support for gripping the housing and lifting the housing on the posts 13 and 15.

The exhaust outlets 31 and 32 can be seen as having dampers 38 which are electronically controlled based on the reading of the temperature in the housing 11. Looking at the posts 13, 15, 40 and 41, each is formed in a channel having elongated opening 42 on the inside of each post and in FIGS. 1 and 2 a collection container 43 is sitting on legs 44 and is seen at one end of the endless belt conveyor 24.

Turning to FIGS. 1, 2, 4 and 5, the operation of the lift mechanism is more clearly illustrated in which the transverse beam 16 is seen having a portion of a motor 45 mounted therein behind the cover 17 and driving a pulley 51 and the horizontally extending shaft 46 which shaft is located both in the transverse beam 16 and in the beam 14 and is supported in bearings 47 and 48. The shaft 46 has a pulley 51 mounted therein which is driven by a belt drive from the motor 45. At each end of the shaft 46 a sprocket 52 is mounted therein within each of the upright posts 15, 40, 41, and 13. The sprocket has an endless chain 53 positioned therearound and positioned around a rotating sprocket 54 mounted to a shaft 55 at the top of each of the channel posts 15. The chain 53 is attached to a lifting member 56 which is square shaped so as to follow the inside walls of the channel 15 in the raising and lowering of the member 56 by the rotation of the chain 53 on the sprockets 52 and 54. The guide and support member 56 has an extending support bracket 57 attached thereto which has a pair of bolts 58 which attach directly to the strengthening and support brackets 37 for the cover 11.

Thus actuation of the motor 45 drives the shaft 46 to drive sprockets 52 at each end of the shaft 46 in each pair of posts to thereby drive a chain 53 to drive a guide and lifting member 56 up or down inside the channel posts 15 and the corresponding channel posts 41 on the other side of the cover 11 to thereby lift the bracket 57 and cover supporting brace 37 to lift the cover from the position shown in FIG. 1 to the position shown in FIG. 2. This allows ready access to the entire inside of the shrimp cooking apparatus 10 for both the rapid cleaning and repair as necessary. The motors 45 can then be reversed to lower the cover back to the position shown in FIG. 1. The advantages of the lift provide a great convenience both in the cleaning and repair of machinery and the raising and lowering of the housing which can be done rapidly and automatically by activating motor 45 in each direction.

Referring to FIGS. 3 and 7, operation of the steam system is illustrated in which a main steam line or manifold 60 is connected from a solenoid actuated valve 61 to feed through a pressure regulator 62 into the main steam pipe 60 which feeds a plurality of individual steam pipes and nozzles 63. A steam pressure gauge 64 allows monitoring of the steam pressure and temperature and a plurality of thermistor type heat sensors 65 are connected through control boxes 66 and are electronically connected to individual solenoid valve 67 which can turn the steam on or off for any one of the plurality of steam nozzle pipes 63 which direct the steam directly beneath the porous endless belt 24 up into the raised area 68 in the housing cover 11 where the temperature and pressure are maintained by an automatic actuation of the solenoid 67 responsive to the sensors 65 and simultaneously by the release of steam and pressure through the outlets 31 and 32 controlled by the electronic dampers 38. Each nozzle pipe 63, in addition to the solenoid actuation valve 67, has a manually actuated valve 70 controlled by handles 71 for manually controlling the turning off of any particular valve. Each nozzle 63 is individually controlled in response to the requirements for that particular area to control heat and steam uniformly throughout the inside of the cover housing 11 in the raised area 68 as the shrimp pass on the conveyor belt therethrough.

As explained in my prior U.S. patents, the system eliminates the use of a plurality of entrance doors into the housing 11 having one solid container which is made lightweight and of great strength by the use of layered stainless steel supported with a layer of insulating rigid foamed polymer, such as polystyrene or polyurethane. The invention advantageously cooks the shrimp while maintaining a minimum weight loss and while simultaneously destroying or removing bacteria. However, the present invention is not to be construed as limited to the forms shown which are to be considered illustrative rather than restrictive.

I claim:

1. A shrimp cooking apparatus comprising:

a frame including a plurality of upright members;

a motor driven endless belt conveyor having a porous endless belt supported on said frame;

a housing covering a portion of said porous endless belt and supported on said frame, said housing having an entrance thereinto and an exit therefrom and said housing being formed from spaced inner and outer layers of metal having a predetermined layer of insulation therebetween;

a housing lift mechanism attached to said plurality of frame upright members and to said housing for lifting said housing relative to said plurality of frame upright members to thereby gain access inside said housing;

a steam feed pipe connected to a source of steam and connected to a plurality of steam nozzles for directing steam into said housing;

a plurality of solenoid valves, each valve being operatively connected to open and close one said steam feed pipe nozzle to thereby control the feeding of steam into said housing;

control system connected to each of said plurality of solenoid valves for controlling the operation of said valves; and a plurality of sensors for sensing heat in said housing, each said sensor being operatively connected to said control system whereby said control system can control the flow of steam into said housing responsive to said plurality of sensors sensed conditions and whereby shrimp can be cooked to a predetermined degree.

2. A shrimp cooking apparatus in accordance with claim 1 in which each pair of said frame upright members is connected with a transverse frame member to thereby form a generally U-shaped support frame portion.

3. A shrimp cooking apparatus in accordance with claim 2 in which each U-shaped support frame portion has two legs extending therefrom.

4. A shrimp cooking apparatus in accordance with claim 3 in which said U-shaped support frame portion leg is adjustable attached thereto for leveling said shrimp cooking apparatus.

5. A shrimp cooking apparatus in accordance with claim 4 in which lift mechanism includes a chain riding on a plurality of sprockets and said chain being attached to said housing lift bracket portion.

6. A shrimp cooking apparatus in accordance with claim 5 in which said lift mechanism includes an electric motor and said electric motor is operated through a switch to raise or lower said housing.

7. A shrimp cooking apparatus in accordance with claim 6 in which said lift mechanism is coupled through said transverse beam to a frame upright member on either side of said housing and a shaft drives a pair of chain drives to operate a pair of lifts.

8. A shrimp cooking apparatus in accordance with claim 1 in which said housing has a support bracket extending thereover and attached thereto and attached on either side of said housing to said lift mechanism to thereby reinforce said housing for the lifting of said housing.

9. A shrimp cooking apparatus in accordance with claim 8 in which housing support bracket is a generally U-shaped bracket extending over said housing and being fixedly attached thereto.

10. A shrimp cooking apparatus in accordance with claim 9 in which housing inner and outer metal layers are stainless steel having a layer of polymer insulation therebetween.

11. A shrimp cooking apparatus in accordance with claim 10 in which housing insulation layer is a rigid foamed polymer.

12. A shrimp cooking apparatus in accordance with claim 11 in which housing inner and outer layers are connected around said layer of insulation with bracing members.

13. A shrimp cooking apparatus in accordance with claim 12 in which said conveyor belt is a stainless steel mesh belt.

14. A shrimp cooking apparatus in accordance with claim 13 in which said housing has a pair of openings in the top thereof and each said opening has an exhaust pipe connected thereto and each said opening has an electric damper valve therein.

15. A shrimp cooking apparatus in accordance with claim 14 in which housing has a raised portion and said endless conveyor belt has a raised portion inside said housing to thereby lift shrimp thereon to a raised area in said housing.

16. A shrimp cooking apparatus comprising:
a frame including a plurality of pairs of upright posts, and a transverse beam member connected between each pair of said plurality of upright posts;
a motor driven endless belt conveyor having a porous endless belt supported on said frame between said upright posts and above each transverse beam and supported on said transverse beam;
an upper housing covering a portion of said porous endless belt and supported on said frame, said housing having an entrance thereinto and an exit therefrom;
an upper housing lift mechanism attached between said a plurality of frame upright members and said upper housing for lifting said housing relative to said plurality of frame upright members to thereby gain access inside said housing;
a steam feed pipe connected to a source of steam and connected to a plurality of steam nozzles for directing steam into said housing;
a plurality of solenoid valves, each valve being operatively connected to open and close one said steam feed pipe nozzle to thereby control the feeding of steam into said housing;
a control system connected to each of said plurality of solenoid valves for controlling the operation of said valves; and
a plurality of sensors for sensing the heat in said housing, each said sensor being operatively connected to said control system whereby said control system can control the flow of steam into said housing responsive to said plurality of sensors sensed conditions, whereby shrimp can be cooked to a predetermined degree.

17. A shrimp cooking apparatus in accordance with claim 16 in which said upper housing is formed from spaced inner and outer layers of metal having a predetermined layer of insulation therebetween.

18. A shrimp cooking apparatus in accordance with claim 17 in which upper housing has a support bracket extending thereover and attached thereto and attached on either side of said upper housing to said lift mechanism.

19. A shrimp cooking apparatus in accordance with claim 18 in which said lift mechanism is coupled through said beam to a frame upright member on either side thereof for operating a pair of lifts from a common drive mechanism.

20. A shrimp cooking apparatus in accordance with claim 16 in which said upper housing lift mechanism includes a guide block located inside each upright post and connected to each chain for sliding inside each said frame upright member and each said guide block being connected to said upper housing for lifting said upper housing responsive to movement of said chain.

21. A shrimp cooking apparatus in accordance with claim 20 in which each said guide block has a bracket attached thereto and attached through a slot in each said upright member to said upper housing support member.

22. A shrimp cooking apparatus comprising:
a frame including a plurality of upright members;
a motor driven endless belt conveyor having a porous endless belt supported on said frame;
a housing covering a portion of said porous endless belt and supported on said frame, said housing having an entrance thereinto and an exit therefrom and said housing being formed from spaced inner and outer layers of stainless steel having a predetermined layer of insulation therebetween;
a housing lift means for lifting said housing, said housing lift means being attached to said plurality of frame upright members and to said housing for lifting said housing relative to said plurality of frame upright members to thereby gain access inside said housing;

a steam feed means for feeding steam into said housing, said steam feed means being connected to a source of steam and connected to a plurality of steam nozzles for directing steam into said housing;

valve means operatively connected to open and close said steam feed means to thereby control the feeding of steam into said housing;

control means connected to each of said valve means for controlling the operation of said valve means; and sensor means for sensing heat in said housing, said sensor means being operatively connected to said control means whereby said control means can control the flow of steam into said housing responsive to said plurality sensor means sensed conditions and whereby shrimp can be cooked to a predetermined degree.

* * * * *